US012325348B2

(12) United States Patent
Tassé et al.

(10) Patent No.: US 12,325,348 B2
(45) Date of Patent: Jun. 10, 2025

(54) EMERGENCY LIGHTS ASSEMBLY FOR EMERGENCY VEHICLES PROVIDED WITH AN AIR CONDITIONING UNIT

(71) Applicant: DEMERS, AMBULANCE MANUFACTURER INC./ DEMERS, MANUFACTURIER D'AMBULANCES INC., Beloeil (CA)

(72) Inventors: Yannick Tassé, Varennes (CA); Gabriel Renaud, Laval (CA); Yvon Blais, St-Jean-Baptiste (CA); Patrick Bérubé, Sainte-Madeleine (CA); Vincent St-Pierre, Saint-Hyacinthe (CA); Luc Bourgeois, Terrebonne (CA); François Couillard, Blainville (CA); Vincent Faucher, Saint-Hippolyte (CA); Jean-Frédéric Beaudoin, Boisbriand (CA)

(73) Assignee: DEMERS, AMBULANCE MANUFACTURER INC./DEMERS, MANUFACTURIER D'AMBULANCES INC., Beloeil (CA)

(*) Notice: Subject to any disclaimer, the term of this patent is extended or adjusted under 35 U.S.C. 154(b) by 0 days.

(21) Appl. No.: 18/596,182

(22) Filed: Mar. 5, 2024

(65) Prior Publication Data
US 2024/0300402 A1 Sep. 12, 2024

Related U.S. Application Data

(60) Provisional application No. 63/488,611, filed on Mar. 6, 2023.

(51) Int. Cl.
B60Q 1/00 (2006.01)
B60H 1/00 (2006.01)
B60Q 1/26 (2006.01)
B60Q 1/52 (2006.01)

(52) U.S. Cl.
CPC ....... *B60Q 1/0017* (2013.01); *B60H 1/00414* (2013.01); *B60H 1/00521* (2013.01); *B60Q 1/0041* (2013.01); *B60Q 1/2611* (2013.01); *B60Q 1/52* (2013.01)

(58) Field of Classification Search
CPC ............ B60H 1/00414; B60H 1/00521; B60Q 1/2611; B60Q 1/0041; B60Q 1/0029; B60Q 1/0017
See application file for complete search history.

(56) References Cited

U.S. PATENT DOCUMENTS

| 6,374,626 | B1 | 4/2002 | Takahashi |
| 8,973,962 | B2 | 3/2015 | Van Arnam et al. |
| 10,413,458 | B2 | 9/2019 | Barnes et al. |
| 11,896,534 | B2* | 2/2024 | Barnes ............... B60H 1/00521 |

(Continued)

OTHER PUBLICATIONS

Innovation Q+ NPL Search (Year: 2024).*

*Primary Examiner* — Anabel Ton
(74) *Attorney, Agent, or Firm* — Agence de Brevets Fournier

(57) ABSTRACT

An emergency lights assembly for emergency vehicles provided with an air conditioning unit is aerodynamically shaped, surrounds at least a portion of an air conditioning unit, and includes a front fresh air inlet and a top air outlet allowing the assembly to be mounted directly in contact with the cab of an emergency vehicle.

14 Claims, 5 Drawing Sheets

(56) References Cited

U.S. PATENT DOCUMENTS

2015/0048640 A1\* 2/2015 Barnes ................. B60Q 1/2611
62/239
2017/0027783 A1\* 2/2017 Barnes ................... A61G 3/008

\* cited by examiner

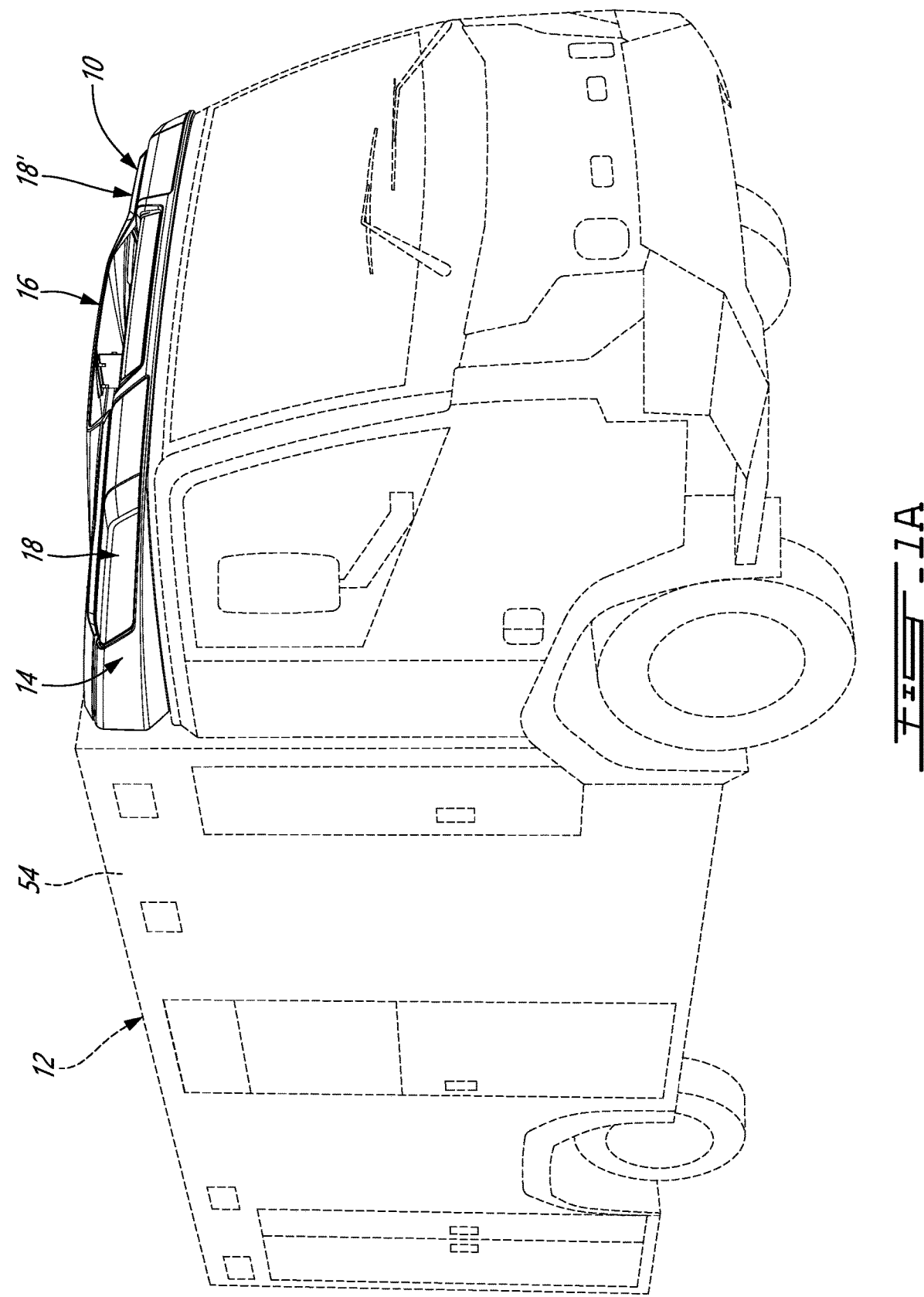

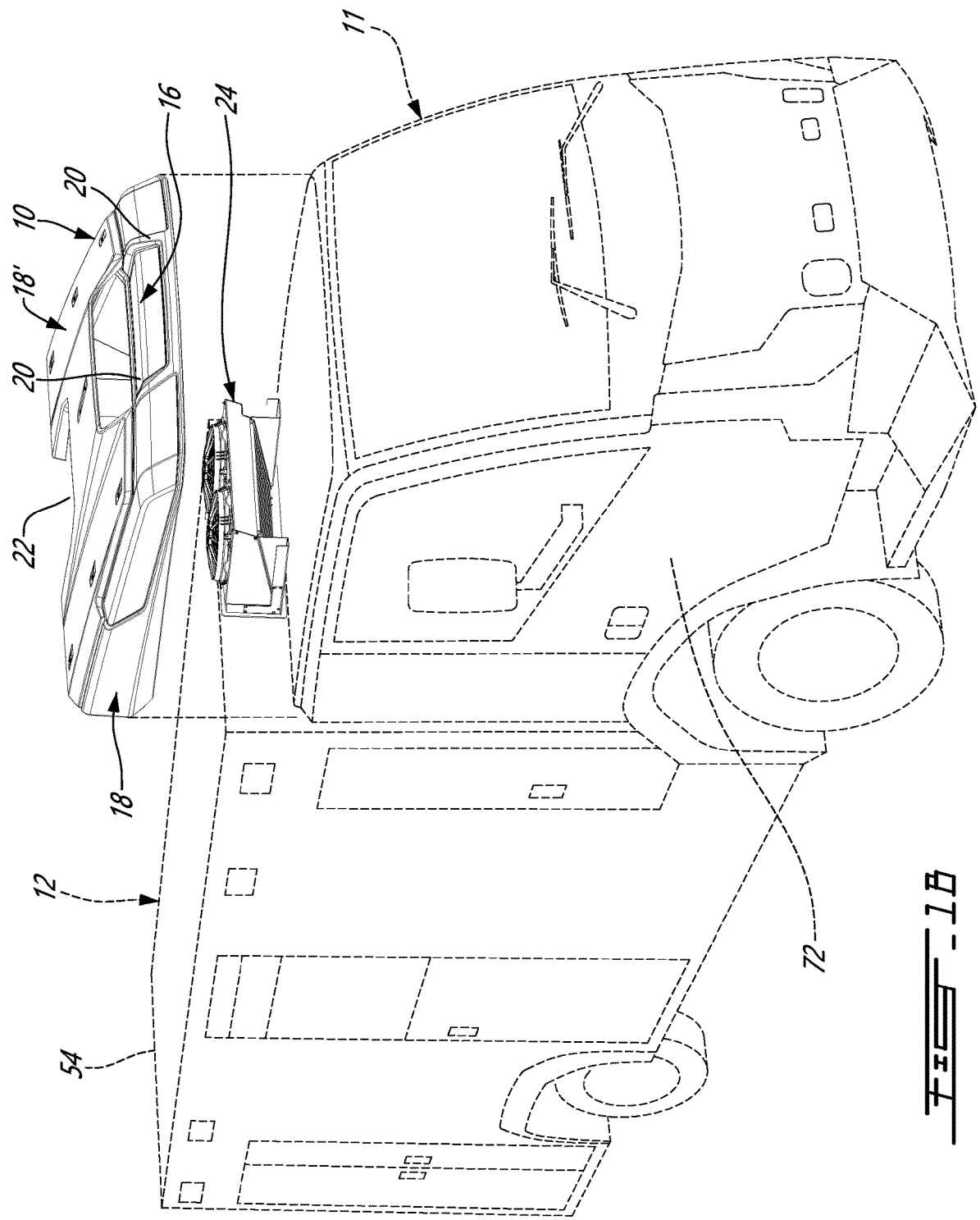

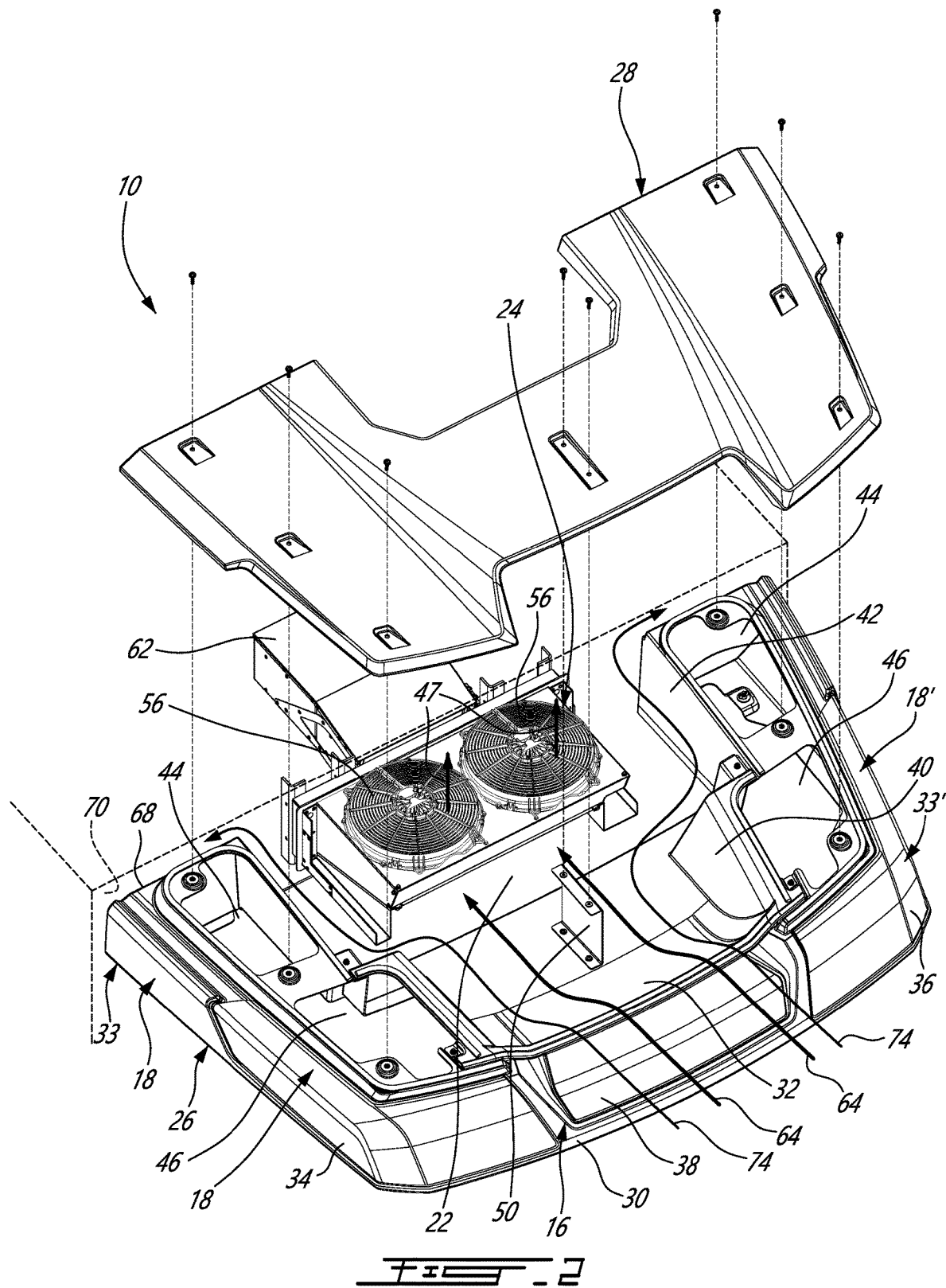

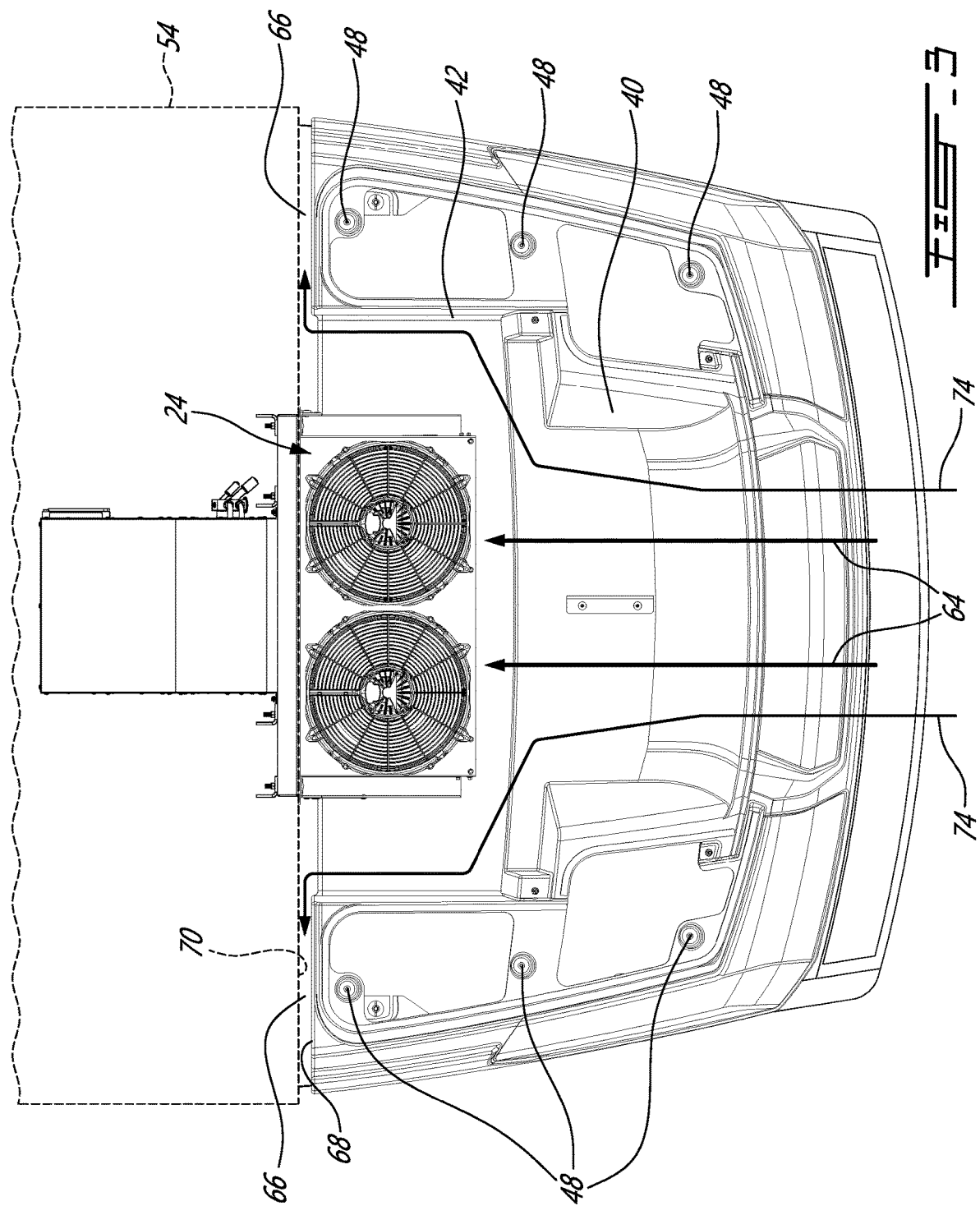

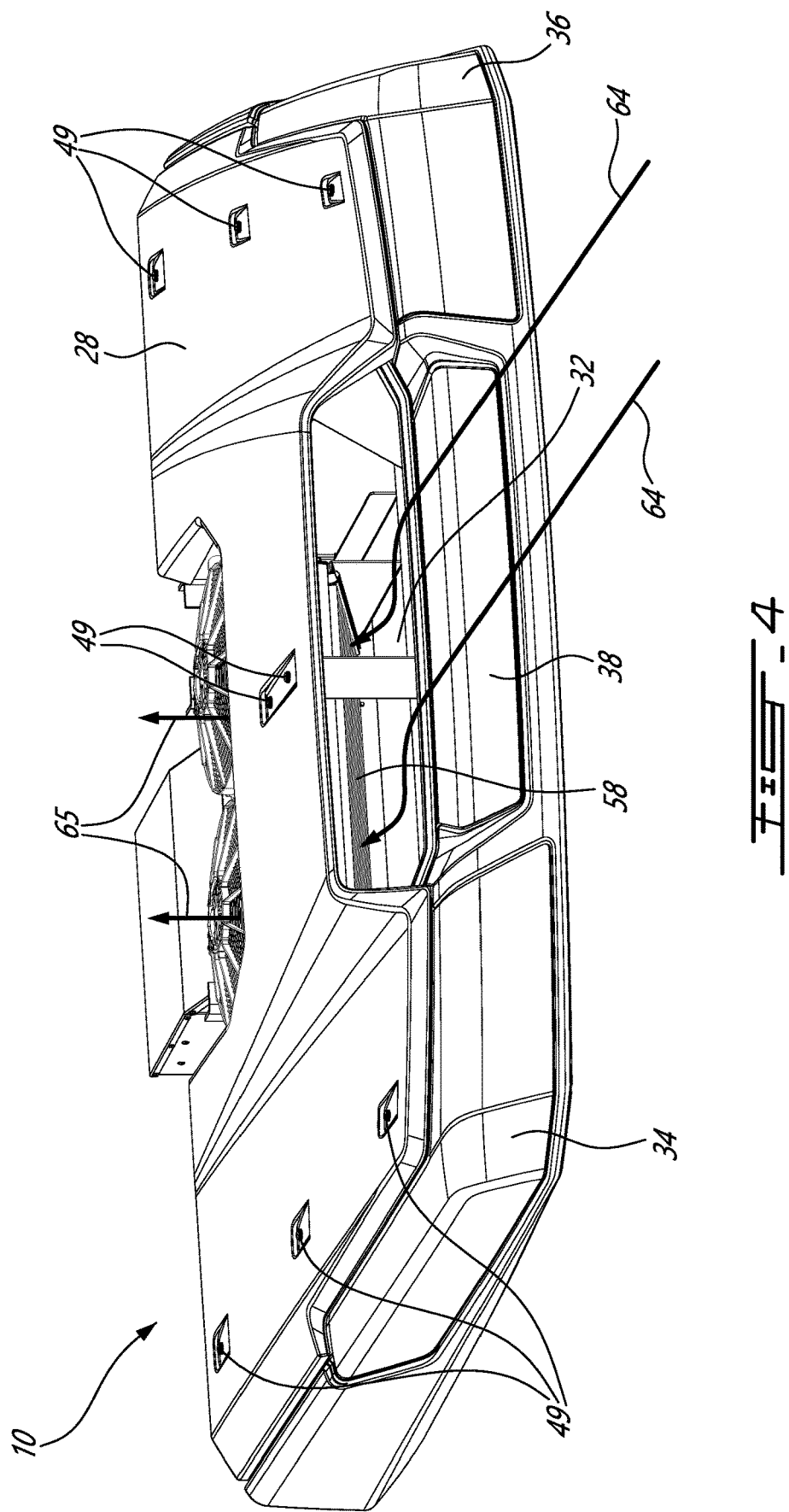

EMERGENCY LIGHTS ASSEMBLY FOR EMERGENCY VEHICLES PROVIDED WITH AN AIR CONDITIONING UNIT

CROSS REFERENCE TO RELATED PATENT APPLICATION

This application claims the benefit of U.S. Provisional Application No. 63/488,611, filed on Mar. 6, 2023, the content of which is incorporated by reference herein.

FIELD

The present disclosure relates to Emergency lights assemblies for emergency vehicles. More specifically, the present disclosure is concerned with such emergency lights assemblies for emergency vehicles provided with an air conditioning (AC) unit.

BACKGROUND

Most emergency vehicles are provided with both an AC unit and emergency lights.

Conventionally, the condenser of the AC unit is mounted centrally, protruding from the front face of the emergency compartment of the vehicle and emergency lights are provided on either side of the condenser. This arrangement lacks aerodynamic properties.

It has been suggested to combine the external condenser and the emergency lights in a package that is not aerodynamic. Indeed, in these combinations, the air intake and outlet are often collinear and therefore require the condenser to be mounted at a sufficient distance from the top of the cab of the vehicle to allow for fresh air intakes.

Object

An object is to provide an emergency lights assembly for an emergency vehicle provided with an AC unit.

SUMMARY

Generally stated, an illustrative embodiment is concerned with an emergency lights assembly that is aerodynamically shaped and includes a front fresh air inlet and a top air outlet allowing the assembly to be mounted directly on and above the cab of an emergency vehicle provided with an AC unit.

According to another illustrative embodiment, there is provided an emergency lights assembly for an emergency vehicle provided with an air-conditioner (AC) unit, the assembly comprising:
- an aerodynamic casing defined by a central portion and two side portions, each extending on a respective lateral side of the central portion;
- the casing being shaped to define a volume adjacent the central portion, between the two side portions, for receiving in the volume at least part of the AC unit;
- two lens assemblies, defined by translucid walls of the casing, each of the two lens assemblies extending along at least part of a respective one of the two side portions and along at least part of the central portion;
- two lodgings in the casing, each adjacent a respective one of the two lens assemblies and defining an emergency light-receiving compartment;
- an opening in the central portion of the casing that is in fluid communication with the volume;

whereby, the opening in the central portion defining an air inlet for the AC unit when the casing is mounted to the emergency vehicle so that the AC unit is positioned in the volume.

According to a more specific embodiment, the emergency lights assembly includes a removable top cover allowing, amongst other things, the maintenance of the AC unit and of the emergency lights.

The expression "aerodynamic casing" is to be construed in the description and in the claims as a casing that reduces friction of the air compared to the object(s) intended to be included in the casing without such casing.

Other objects, advantages, and features of the emergency lights assembly for an emergency vehicle will become more apparent upon reading the following non-restrictive description of illustrative embodiments thereof, given by way of example only with reference to the accompanying drawings.

BRIEF DESCRIPTION OF THE DRAWINGS

In the appended drawings:

FIGS. 1A and 1B are perspective views of an emergency vehicle provided with an emergency lights assembly according to an illustrative embodiment; FIG. 1B showing the emergency lights assembly removed from the emergency vehicle;

FIG. 2 is a perspective view of the emergency lights assembly of FIG. 1, showing the cover thereof removed;

FIG. 3 is a top plan view of the emergency vehicle of FIG. 1, where the cover of the emergency lights assembly is absent; and FIG. 4 is a perspective view of the emergency lights assembly of FIG. 1.

DETAILED DESCRIPTION

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

In the following description, similar features in the drawings have been given similar reference numerals, and in order not to weigh down the figures, some elements are not referred to in some figures if they were already identified in a precedent figure. Herein, it shall further be noted that, for avoiding unnecessary details obscuring the invention, only device structures and/or processing steps closely relevant to schemes according to the invention are shown in the accompanying drawings while omitting other details less relevant to the invention.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, un-recited elements.

In the present specification and in the appended claims, various terminology, which is directional, geometrical and/or spatial in nature such as "longitudinal", "horizontal", "front", rear", "upwardly", "downwardly", etc. is used. It is to be understood that such terminology is used for ease of description and in a relative sense only and is not to be taken in any way as a limitation upon the scope of the present disclosure.

FIGS. 1A and 1B of the appended drawings show an illustrative embodiment of an emergency lights assembly 10, mounted in contact with the top of the cab 11 of an emergency vehicle 12, shown in dashed lines.

With reference to FIGS. 1B and 2, the assembly 10 includes a generally aerodynamic U-shaped casing 14 defined by a central portion 16 and two side portions 18, 18', each extending on a respective lateral side 20 of the central portion 16, towards the back of the vehicle 12.

The casing 14 defines a volume 22, adjacent and behind the central portion 16, between the two side portions 18, 18'. The volume 22 allows receiving at least part of an air-conditioner (AC) unit 24 of the emergency vehicle 12.

The generally U-shaped casing 14 is tapered along its full width from the volume to the frontal side of the central portion 16 and extends on the full surface of the cab 11. According to another illustrative embodiment, the casing 14 does not extend along the full width and or full length of the cab 11.

As can be better seen in FIG. 2, which illustrates the assembly 10, the casing 14 includes a body 26, mountable to the top of the cab 11 of the emergency vehicle 10, and a removable cover 28. The body 26 includes a generally slanted aerodynamic front face 30, including, in the central portion 16, an opening 32 partially defined by the top cover 28, and side portions 18, 18'.

The opening 32 is in fluid communication with the volume 22 that houses the AC unit 24 and defines an air inlet therefor.

The lateral portion 18 and 18' of the body 26 are provided with L-shaped outer walls 33, 33' that includes translucid parts that define respective L-shaped lenses 34 and 36 of the emergency lights (not shown), and that extend partly on lateral side of the body 26 and partly on the front side thereof. The front face 16 also includes a central lens 38 provided below the central air inlet aperture 32 and defined by a translucid part of the body 26.

According to another illustrative embodiment (not shown), the lens 34 or 36 is replaced by a lens assembly including a plurality of separate lens portions.

According to the illustrative embodiment, the lenses 34, 36 are independent parts attached to the remaining part of the body 26 by press-fitting, or using fasteners, adhesives, or the likes.

According to another illustrative embodiment (not shown), the lenses 34, 36 and/or 38 extend the full length of the corresponding front and lateral portions 16, 18 and 18'.

Each lateral portion 18, 18' further includes generally L-shaped inner walls 40, 42 that are abutted together and to the L-shaped outer walls 33, 33', to define compartments 44 and 46 for housing the emergency lights (not shown).

The inner and outer walls forming the body 26 are attached together and to the top of the cab 11 of an emergency vehicle 12 via fasteners (not shown). The body 26 further includes top walls that are provided with fastener-receiving holes 48, that allows receiving and attaching the removable cover 28 using fasteners 49 (see on FIG. 4). A small support 50 is attached to the body 26, between the inlet opening 32 and the AC-receiving volume 22 to add further strength to the assembly of the body 26 and cover 28.

The removable cover 28 is generally configured to complement the shape of the body 26 and, along with the body 26, to define an aerodynamic shape.

The body 26 and cover 28 are made of a hard and resilient material, such as fiberglass, carbon fiber, TPO, ABS or acrylic.

As can be better seen from FIG. 2, access to the emergency lights, conventionally provided close to the lenses 34-38, is facilitated when the top cover 28 is removed.

Internal structural walls, such as walls 40 and 42, both protect the emergency lights from the elements and help channel the fresh air as will be further described hereinbelow.

The AC unit 24 is mounted to the front surface 70 of the emergency compartment 54 or adjacent thereto and conventionally includes two condenser fans 56 provided above a condenser 58 (see FIG. 4) located outside of the emergency compartment in the volume 22 defined thereby. Other elements of the AC unit 24 such as an evaporator/PTC/duct unit 62 are located inside the emergency compartment 54 of the emergency vehicle 12, as can be better seen in FIG. 3, to thereby cool its internal volume. It is to be noted that some parts of the AC unit 24 have been omitted so as to alleviate the views, such as, for example, the compressor.

With references to FIGS. 2-4, fresh air entering through the front facing fresh air inlet 32 is drawn generally horizontally through the condenser 58 by the condenser fans 56 and exits the unit generally vertically. Arrows 64 illustrate the fresh air flow from outside the emergency lights assembly 10 to the condenser 58, while arrows 65 illustrate the outlet of the air from the AC unit 24.

The operation of an AC unit is believed to be well known in the art and will therefore not be described herein for concision purposes.

As mentioned hereinabove, the internal structural walls 40 and 42 channel the fresh inlet air towards the condenser 58.

Of course, since the fresh air inlet 32 is basically a front facing aperture in the emergency lights assembly 10, water, and other environmental elements such as leaves may enter the assembly 10 therethrough. As mentioned hereinabove, the cover 28 is easily removable to allow the cleaning of the internal volume of the assembly 10.

Of course, one skilled in the art will understand that a front grille (not shown) may be installed in aperture 32 to reduce the need for cleaning.

Furthermore, a way for water to egress the internal volume of the emergency lights assembly 10 is provided. Indeed, as can be better seen from FIG. 3, a gap 66 is provided between the rear surface 68 of the body 26 and the front surface 70 of the emergency compartment 54, which define channels on both lateral side 18, 18' to allow water entering the emergency lights assembly 10 from the fresh air inlet 32 to egress. It is to be noted that the position of these channels 66 makes it so that the water exits the assembly behind the doors 72 (only one shown) of the driver compartment 11 of the vehicle 12. As mentioned hereinabove, the internal structural walls 40 and 42, help protect the emergency lights from the elements while channeling the water entering the emergency lights assembly 10 towards the channels 66 (see arrows 74).

It is to be noted that many modifications could be made to the emergency lights assembly 10 described hereinabove and illustrated in the appended drawings. For example:

- the cover 28 is not limited to be removably attachable to the body 26 via fasteners or to be removable at all;
- the inner and outer walls of the side portions 18 and 18' of the body 26 are not limited to be L-shaped. More generally, the overall shape of the assembly may be different than illustrated;
- the body part 26 of the assembly 10 can be attached to the emergency vehicle 12 using other fastening means than fasteners, such as, for example, an adhesive. The assembly 10 can also be integral to the vehicle 12;
- the emergency lights assembly 10 can be adapted to an AC unit having different shape and configuration then unit 24;
- the assembly 10 can alternatively or additionally be mounted to the emergency compartment 54.

It is to be understood that the emergency lights assembly is not limited in its application to the details of construction and parts illustrated in the accompanying drawings and described hereinabove. The emergency lights assembly is capable of other embodiments and of being practiced in various ways. It is also to be understood that the phraseology or terminology used herein is for the purpose of description and not limitation. Hence, although the emergency lights assembly has been described hereinabove by way of illustrative embodiments thereof, it can be modified, without departing from the spirit, scope and nature thereof.

What is claimed is:

1. An emergency lights assembly for an emergency vehicle, that is provided with an air conditioning (AC) unit, the assembly comprising:
    an aerodynamic casing defined by a central portion and two side portions, each extending on a respective lateral side of the central portion; the casing being both i) mechanically uncoupled from the AC unit, and ii) shaped to define a volume adjacent the central portion, between the two side portions, for receiving in the volume at least part of the AC unit;
    two lens assemblies, defined by translucid walls of the casing, each of the two lens assemblies extending along at least part of a respective one of the two side portions and along at least part of the central portion;
    two lodgings in the casing, each adjacent a respective one of the two lens assemblies and defining an emergency light-receiving compartment;
    an opening in the central portion of the casing that is in fluid communication with the volume;
    whereby, the opening in the central portion defining an air inlet for the AC unit when the casing is mounted to the emergency vehicle so that the AC unit is positioned at least partly in the volume.

2. The emergency lights assembly as recited in claim 1, wherein the aerodynamic casing is defined by a body and a cover.

3. The emergency lights assembly as recited in claim 2, wherein the cover is removably mounted to the body.

4. The emergency lights assembly as recited in claim 2, wherein the body is generally U-shaped.

5. The emergency lights assembly as recited in claim 2, wherein the body is defined by at least one outer wall and at least one inner wall; the at least one inner wall defining a deflector for deflecting air from the air inlet to the AC unit.

6. The emergency lights assembly as recited in claim 5, wherein the emergency vehicle includes driver and emergency compartments; the casing is mounted to the driver compartment thereon at a distance from the emergency compartment so that each of the two side portions defines a channel with the emergency compartment; the deflector being further configured to deflect water entering the air inlet towards the channels.

7. The emergency lights assembly as recited in claim 5, wherein the at least one inner wall further defines the two lodgings.

8. The emergency lights assembly as recited in claim 1, wherein the emergency vehicle includes driver and emergency compartments; the aerodynamic casing being mounted to the driver compartment thereon so as to extend along at least one of the full width and the full length of the driver compartment.

9. The emergency lights assembly as recited in claim 8, wherein the aerodynamic casing is tapered from a back side to a front side of the driver compartment.

10. The emergency lights assembly as recited in claim 1, wherein the aerodynamic casing is mounted on the top of a driver compartment of the emergency vehicle.

11. The emergency lights assembly as recited in claim 1, further comprising a third lens assembly mounted to the central portion of the aerodynamic casing.

12. The emergency lights assembly as recited in claim 11, wherein the third lens assembly is defined by translucid walls of the central portion of the casing.

13. An emergency lights assembly for an emergency vehicle, that is provided with an air conditioning (AC) unit, having driver and emergency compartments, the assembly comprising:
    an aerodynamic casing that includes a body for mounting to the driver compartment and a cover removably mounted to the body; the aerodynamic casing being tapered from a back side of the emergency compartment to a front side thereof and being defined by a central portion and two side portions, each extending on a respective lateral side of the central portion; the casing being shaped to define a volume adjacent the central portion, between the two side portions, for receiving in the volume at least part of the AC unit;
    two lens assemblies, defined by translucid walls of the casing, each of the two lens assemblies extending along at least part of a respective one of the two side portions and along at least part of the central portion;
    two lodgings in the casing, each adjacent a respective one of the two lens assemblies and defining an emergency light-receiving compartment;
    an opening in the central portion of the casing that is in fluid communication with the volume;
    whereby, the opening in the central portion defining an air inlet for the AC unit when the casing is mounted to the emergency vehicle so that the AC unit is positioned at least partly in the volume.

14. An emergency lights assembly including an aerodynamically shaped casing for receiving emergency lights therein and surrounding at least a portion of an air conditioning unit; the body includes a generally front facing fresh air inlet and a top facing air outlet.

\* \* \* \* \*